No. 674,596. Patented May 21, 1901.
G. H. BRIDGES & T. C. SMITH.
HAY PRESS.
(Application filed Apr. 14, 1900.)
(No Model.) 2 Sheets—Sheet 1.
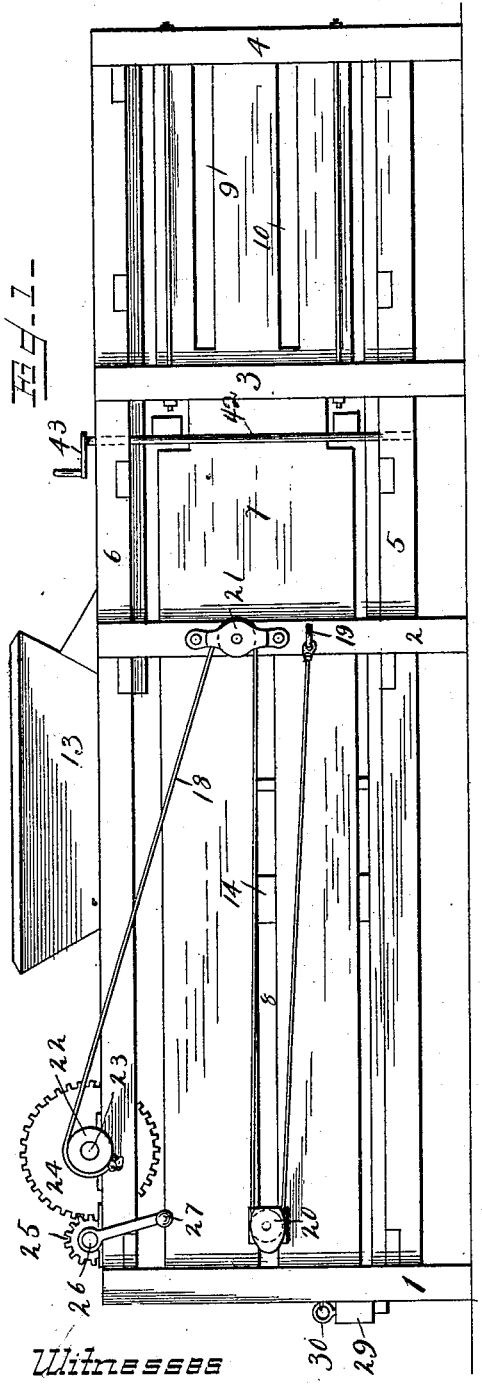
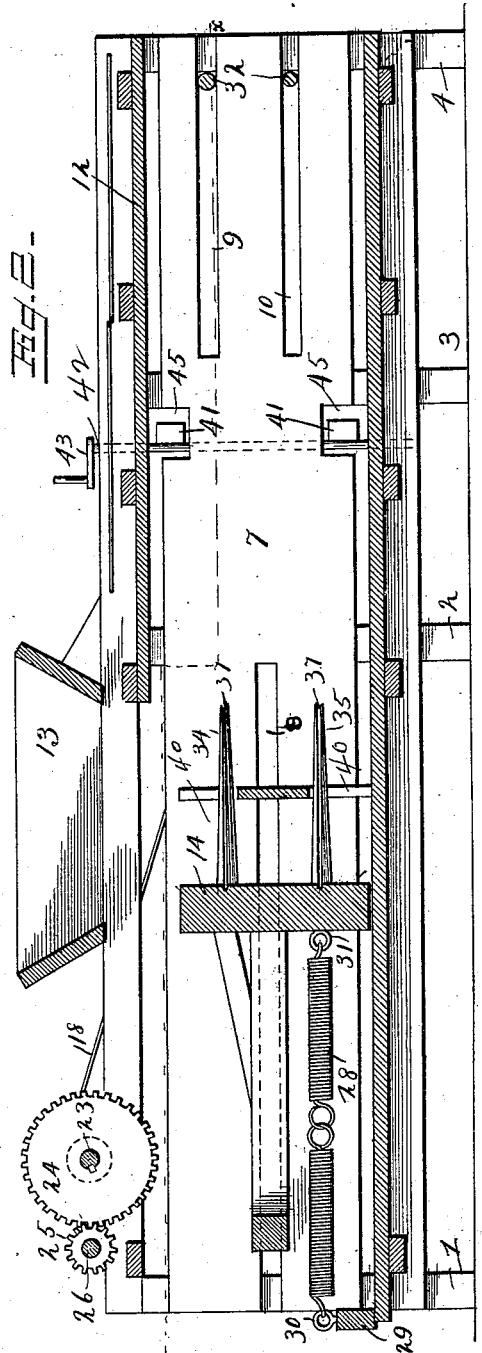
Witnesses
Chas. H. Ourand
J. E. Exley
Inventors
George H. Bridges
and Thomas C. Smith.
By W. J. Fitzgerald
Attorneys.

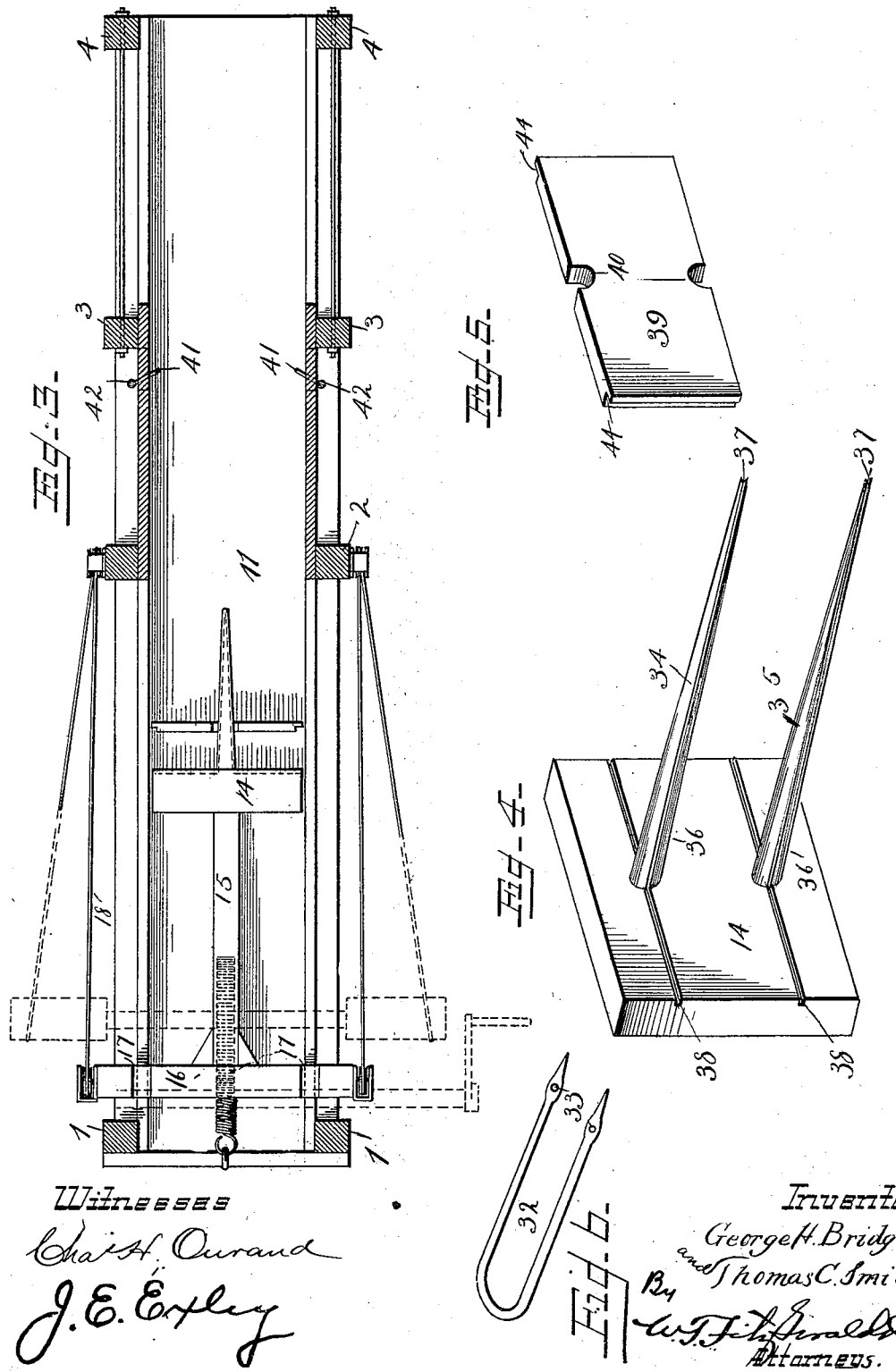

UNITED STATES PATENT OFFICE.

GEORGE HARDIN BRIDGES AND THOMAS CHESLY SMITH, OF CHARLESTON, MISSOURI.

HAY-PRESS.

SPECIFICATION forming part of Letters Patent No. 674,596, dated May 21, 1901.

Application filed April 14, 1900. Serial No. 12,896. (No model.)

*To all whom it may concern:*

Be it known that we, GEORGE HARDIN BRIDGES and THOMAS CHESLY SMITH, citizens of the United States, residing at Charleston, in the county of Mississippi and State of Missouri, have invented certain new and useful Improvements in Hay-Presses; and we do hereby declare the following to be a full, clear, and exact description of the invention, such as will enable others skilled in the art to which it appertains to make and use the same.

Our invention relates to presses, and more particularly to that variety thereof usually termed "hay-presses," though it will be found equally useful and efficient for pressing into compact shapely bales all such material as hay, cotton, hemp, &c.

The object of our invention, among others, is to provide convenient means for bringing great power to bear upon a bale to be compressed at the expense of little force from the operator.

A further object, among others, is to enable the operator to very readily tie or secure the bale after it has been disposed in a compressed condition.

Further objects and advantages will be made fully apparent from the following specification, considered in connection with the accompanying drawings, in which—

Figure 1 is a side view of our invention complete. Fig. 2 is a central longitudinal vertical section. Fig. 3 is a longitudinal section taken on line $x\ x$ of Fig. 2. Fig. 4 is a perspective detail showing the preferred form of plunger to be employed. Fig. 5 is a perspective detail of what we will term our "follower-plate." Fig. 6 is a perspective view of our improved wire-threading needles.

In referring to the several parts of our invention and their coöperating accessories numerals will be employed, of which 1, 2, 3, and 4 are the usual uprights, the same being duplicated upon each side and may be multiplied in number as deemed necessary, while 5 and 6 represent, respectively, the lower and upper sections of the frame, which may be connected to the said uprights by bolts or otherwise, the object being to provide a strong outer frame designed to hold in its operative position the interior casing 7. The one end of the casing thus constructed is provided upon each side with the longitudinally-disposed slot 8, while the opposite end thereof is provided with two longitudinally-disposed slots 9 and 10, the latter being at that end of the casing wherein the bale is formed and are designed to subserve a purpose which will be hereinafter fully set forth. It will be seen that we have therefore provided a rectangular frame having a suitable bottom 11 and also a top section 12, a portion of which is cut away and provided with the receiving-hopper 13, through which the hay or other material to be compressed is introduced into the compression-chamber.

In Fig. 3 we have shown a plunger-head 14, provided with a suitable piston 15, which is firmly connected in any preferred way to said head and also to the driving-beam 16, which is provided near each end with a recess 17, which reduces said beam sufficiently to enable the reduced part to be received by the slotted opening 8, thereby holding said beam against lateral movement when it is drawn toward the compression-chamber by means of the actuating-rope 18. The actuating-rope 18 is secured at one end to the anchoring-bolt 19, and from thence passes around a pulley 20 to the outer end of the beam 16, and thence passes around the pulley 21, secured to the upright 2, and from thence passes to the winding-drum 22, where it is secured. The winding-drum is secured to the supporting-axle 23, mounted in suitable bearings upon the upper portion of the frame, while said shaft has attached, preferably to the middle portion thereof, the gear 24, designed to mesh with the driving-gear 25, mounted upon the shaft 26, said shaft being manually or otherwise rotated by the crank 27, as clearly shown. It will be understood that the rope 18 and the several pulleys and drum coöperating therewith are to be duplicated upon each side of the machine, in order that equal force may be applied at each end of the beam 16. By this arrangement of the actuating-rope 18 it will be understood that great power may be readily applied to drive the head 14 forward toward the compression-chamber.

By reference to Fig. 2 it will be observed that said head is held in a normally withdrawn position by the compression-spring 28, one end of which is secured to a cross-piece of the frame 29 by means of the eyebolt 30 or otherwise, while the other end is secured directly to the outer side of the head by the eyebolt 31.

By reference to Fig. 2 it will be seen that when the head is in a withdrawn position it will rest under the edge of the hopper 13, through which the hay or other commodity may be readily introduced, and after the desired quantity has thus been placed in position within the receiving-chamber, which is immediately underneath the hopper, the head may be driven forward by the operation of the handle 27, which will force the hay into the compression-chamber proper and against the threading-needles 32, when said bale may be readily secured by wires in the usual manner, it being understood that another pair of threading-needles is to be introduced through the slotted openings 9 and 10 immediately in advance of the head, thus enabling the wires to be drawn through the mass of compressed hay or other substance, inasmuch as each of the eyes 33 is threaded with the end of a wire. It will be understood that the threading-needles or device illustrated in Fig. 6 will also be found very useful to engage the two ends of a wire after it has passed around or through a bale of hay, as by extending said ends through the eyes 33, when said ends may be easily twisted together and effectively secured. As will be seen by reference to the drawings, a hole is provided in the end of each needle adapted to loosely receive the end of the baling-wire, and it is obvious that after the device has thus been threaded and turned sufficiently to twist the ends of the wires together the free ends of the wires may be slipped out of the aperture by which it has been engaged, thus leaving the ends of the wires twisted securely together and insuring that the bale will be reliably secured.

The threading-needles are preferably formed in pairs from a single piece of suitable material, as a heavy wire or a light rod, the ends of which are properly sharpened, as shown in Fig. 6, each of said ends being provided with an aperture 33. The needles thus constructed are preferably placed in position before the hay is introduced, which will leave the pointed ends protruding through the slots 9 and 10, while said needles will lie directly in contact with the end of the casing. After the hay has been introduced into the compression-chamber the ends of the baling-wires may be hooked into the apertures 33, when said needles may be withdrawn, which will cause the baling-wires to be drawn after said needles, and thus leave said wires to occupy the same position as its respective needle had previously filled. After the wires have thus been drawn through at each end of the bale they may be readily twisted together or otherwise secured, and thereby hold the bale of hay or other commodity in a compressed state.

In Figs. 4 and 5 we have illustrated another means which may be adopted in securing the bale after the desired degree of compression has been imparted thereto, said means consisting in providing the head upon its inner surface, preferably on each side of the center thereof, with the tapering threading-needles 34 and 35, each of which is provided upon each side with a longitudinally-disposed groove 36 of sufficient depth to receive one-half, more or less, of the baling-wire, while the free ends of the needles are provided with a retaining notch or recess 37, by which the wire is held in place upon the point of a needle. The notch or recess 37 in the end of the threading-needles 34 and 35 is to be made of proper extent to receive the baling-wire, and it is obvious that when said wire is thus entered in the recess 37 and bent so as to lie in the groove 36 said needles, with their accompanying wire, may be readily thrust into the mass of hay, and thereby cause the bent portion of the wire occupying the recess in the extreme end of the needles to reach sufficiently through the mass of hay to enable them to be grasped, and when said wire is severed at the point where it is thus bent around the point of the needle or the part thereof occupying the recess 37 one of the ends may be bent to the right around the end of the bale, while the other end is bent around to the other side, and since the wires have thus been passed through the bale they may be properly secured, so as to hold the bale in a compressed state. The inner face of the head is provided with the horizontally-disposed grooves 38, which register with the grooves 34 and 35, formed upon the sides of the needle, and are designed to permit the wire to be received.

In Fig. 5 we have illustrated what we will term our "follower-plate" 39, which is provided with the semicircular recesses 40, coinciding in position with and designed to receive the contiguous side of the needles 34 and 35, and it is obvious that after the needles have been provided with the baling-wire, as by extending said wire in the grooves 38 and thence in the grooves 34 and 35 around the point and in the recess 37 and thence along the other side of the needle, said needle is ready for the reception of the follower-plate, which may be placed in position by entering the same between the needles. When the parts are thus assembled, the hay may be introduced through the hopper into the receiving-chamber, when the operating-handle may be properly manipulated, which will cause the head 14 to drive the hay or other commodity into the compression-chamber at the end of the casing or between the uprights 3 and 4, and it is obvious that when the bale has been fully compressed the ends of the needles will extend through suitable slots provided in the end of the frame. The end of the casing may be provided with two horizontally-disposed slots, the upper one corresponding in location with the slot 9, while the lower one corresponds in location to the slot 10, the upper one being designed to receive the upper needle or point 34, while the lower slot is designed for the reception of the needle or point 35, as this arrangement of the end slots will enable the baling-wires to be brought around to the side of the bale by extending the same between the corner of the bale and the contiguous corner-post in order that said end may be connected to the other end of itself. It will be understood that the needles 34 and 45 as they protrude through the bale of hay will carry with them wires that have been previously placed in the recesses or notches 37 in the end of said needles, and it is obvious that by cutting the wire at the point where it rests in said notches the ends of the wire may be grasped and the entire wire on each side of the needle drawn farther through the bale, if desired, and each end carried around to the side of the bale and joined to the other end of itself—that is to say, when the wire has been cut at a point where it rests in the notch 37 two separate binding-wires are thus provided and adapted to engage each its respective side of the bale by being bent around the outside of the bale and being engaged with the other end of itself. In order, therefore, to securely bind the bale in a compressed condition, the end of the wire adjacent to the end of the needle is bent around into contact with the other end of itself resting in the groove 38, and in order to conveniently twist the ends of the wire together and thus secure them we employ the needles or device illustrated in Fig. 6 and designated by the numeral 32 by extending one end of the wire through one of the apertures 33, the other end of the wire being extended through the other aperture. When the ends of the wires have thus been disposed, the device is turned, so as to securely twist the ends of the wire together, and when said wires have been properly twisted the free ends may be removed from the apertures 33, thereby disengaging the device 32. The other wire upon the opposite side of the needle 34 or 35, as the case may be, is treated in a similar manner, thereby securing the opposite side of the bale, and since the bale is composed of a series of flakes or layers of compressed hay said series of layers will be securely held together, inasmuch as there is no tendency of the bale to split longitudinally.

By moving the head 14 sufficiently to cause the protrusion of the ends of the needles 34 and 35 through the end slots (not shown) the follower-plate 39 will have been moved sufficiently to pass the retainers 41, carried by the shafts 42, suitably mounted in a contiguous part of the frame and provided with the operating-handle 43, and it is obvious that after said follower-plate has passed said retainers the same may be moved inward behind said plate and brought to engage the end recesses 44, thereby securing said plate in position, when the head may be withdrawn and the wires cut at the extreme end of the needle, which will enable the free ends of said wires to be drawn around toward the side of the bale and secured to the opposite end of the wire passing out through the groove 38. By reference to the drawings it will be observed that by properly moving the handle 43 the shafts 42 will be turned so as to bring the retainers 41 sufficiently inward to engage the recesses 44, and thus prevent the reverse movement of the follower-plate until said plate is moved sufficiently inward to permit the retainers to be swung inward out of the path of the end of said plate and out of engagement with the recesses 44. After the ends of the wires have been secured together the compressed bale is ready for being removed from the compression-chamber, which can be easily accomplished by again throwing forward the head 14, which will cause the follower-plate to be moved up sufficiently to enable the operator to move the retainers 41 outward into the recesses 45, provided in the casing for the reception of said teeth, when by withdrawing the head 14 the follower-plate will be withdrawn with it, thereby enabling the bale to be moved outward at the end of the casing when the ends or side section thereof has been removed.

While we have described the preferred construction to be adopted in producing the several parts of our invention, we desire to comprehend in this application the substantial equivalent thereof.

Believing that the advantages and use of our improved baling-press have been made fully apparent from the foregoing specification, we will dispense with further reference to the details thereof.

What we claim as new, and desire to secure by Letters Patent, is—

1. In a baling-machine, a head having threading-needles secured to the inner face thereof, said needles being provided with notched ends and a longitudinally-disposed groove upon each side thereof, substantially as specified and for the purpose set forth.

2. The herein-described baling-machine comprising a receiving and compression chamber; a plunger-head and suitable driving mechanism therefor, in combination with needles secured to said head and provided with wire-engaging means whereby a wire may be carried through the bale of hay and then cut and secured around said bale in the manner specified and for the purpose set forth.

3. The herein-described baling-machine comprising a suitable casing having a receiving and a compression chamber; a head and suitable driving mechanism therefor; wire-engaging needles secured to the inner side of said head; a follower-plate having notches or recesses 40 adapted to receive said needles; a controlling-shaft 43 on each side of the compression-chamber having an operating-handle and a detent whereby the follower-plate may be engaged and held until each shaft is rotated by said handle sufficiently to disengage said detent, all substantially as specified and for the purpose set forth.

In testimony whereof we affix our signatures in presence of two witnesses.

GEORGE HARDIN BRIDGES.
THOMAS CHESLY SMITH.

Witnesses:
ELMER F. OGILING,
MILDRED GRAHAM.